United States Patent
Malfait (10) Patent No.: US 6,569,481 B1
(45) Date of Patent: *May 27, 2003

(54) METHOD FOR MAKING A PUFFED FOOD STARCH PRODUCT

(75) Inventor: Jacque L. Malfait, Cobourg (CA)

(73) Assignee: The Quaker Oats Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/281,991

(22) Filed: Mar. 29, 1999

(51) Int. Cl.[7] .............................. A21D 13/00; A23L 1/18
(52) U.S. Cl. ..................... 426/446; 426/450; 426/559; 426/560
(58) Field of Search .................................. 426/559, 549, 426/550, 496, 468, 446, 450, 560

(56) References Cited

U.S. PATENT DOCUMENTS

| | | |
|---|---|---|
| 2,120,138 A | 6/1938 | Mathews et al. |
| 2,162,376 A | 6/1939 | Collatz |
| 2,701,200 A | 2/1955 | Huber |

(List continued on next page.)

FOREIGN PATENT DOCUMENTS

| | | |
|---|---|---|
| BE | 799.316 | 11/1973 |
| BE | 886.895 | 4/1981 |
| BE | 893.770 | 11/1982 |
| BE | 902.360 | 9/1985 |
| BE | 904.631 | 8/1986 |
| BE | 906.029 | of 1987 |
| BE | 1000927 A6 | 5/1989 |
| EP | 0-367-031 | 5/1990 |
| EP | 0-344-867 B1 | 8/1994 |
| GB | 2165437 A | 10/1985 |
| GB | WO 01/62106 | 8/2001 |
| JP | B-176375 | 8/1947 |
| JP | 26 (1950)-2022 | 3/1950 |
| JP | 26 (1951) -296 | 1/1951 |
| JP | 26 (1951)-1096 | 2/1951 |
| JP | 26 (1951)-5287 | 5/1951 |
| JP | 62019121 | 4/1987 |
| JP | 62179346 | 8/1987 |
| JP | 63116647 | 5/1988 |
| JP | 63222653 | 9/1988 |
| WO | WO88/00797 | 2/1988 |
| WO | WO 88/06425 | 9/1988 |
| WO | WO 89/06092 | 7/1989 |
| WO | WO 90/08477 | 8/1990 |
| WO | WO 92/08375 | 5/1992 |
| WO | WO 92/12646 | 8/1992 |

OTHER PUBLICATIONS

Juliano, Beinvenido O., *Properties of the Rice Caryopsis, Rice: Production and Utilization*, pp. 403–437.

Kennedy, Barbara M., *Nutritional Quality of Rice Endosperm, Rice: Production and Utilization*, pp. 439–447.

Li, Chin–Fung, et al., *Rice Snack Foods, Rice: Production and Utilization*, pp. 690–711.

(List continued on next page.)

*Primary Examiner*—Arthur L. Corbin
(74) *Attorney, Agent, or Firm*—Ryndak & Suri (57) ABSTRACT

The present invention includes a method of making a puffed food starch material snack, in particular starch material from grains, having an improved crispy texture and a more aesthetic appearance. The products may be snack chips, cakes, crackers or the like, made from food starch material. Preferably, the starch material is provided primarily in the form of individual kernels or pellets of a cereal grain, such as rice, corn, wheat, rye, oats, millet, sorghum, barley, buckwheat, or mixtures thereof. According to one method, a puffing chamber is provided having inner surfaces and a chamber volume. A bulk amount of the food starch material is placed into the puffing chamber. The bulk amount of food starch material is caused to volumetrically expand. The expanding food starch material is constrained in its expansion in at least a first dimension, while permitting unconstrained expansion of the bulk amount in at least a second dimension.

63 Claims, 7 Drawing Sheets

U.S. PATENT DOCUMENTS

| | | | |
|---|---|---|---|
| 2,954,295 A | 9/1960 | Clausi et al. | |
| 2,954,296 A | 9/1960 | Clausi et al. | |
| 3,637,400 A | 1/1972 | Mullen et al. | |
| 3,650,763 A | 3/1972 | Touba | |
| 3,708,308 A | 1/1973 | Bedenk et al. | |
| 3,753,728 A | 8/1973 | Bedenk et al. | |
| 3,988,484 A | 10/1976 | Shitala | 426/99 |
| 4,073,958 A | 2/1978 | Abe | 426/556 |
| 4,281,593 A | 8/1981 | Gevaert | 99/349 |
| 4,310,560 A | 1/1982 | Doster et al. | 426/285 |
| 4,328,741 A | 5/1982 | Yoshikazu | 99/332 |
| 4,508,736 A | 4/1985 | Bean et al. | 426/19 |
| 4,623,546 A | 11/1986 | Holay et al. | 426/443 |
| 4,667,588 A | 5/1987 | Hayashi | 99/372 |
| 4,734,289 A | 3/1988 | Yamaguchi et al. | 426/302 |
| 4,764,390 A | 8/1988 | Zukerman et al. | 426/438 |
| 4,888,180 A * | 12/1989 | Wu | 426/618 |
| 4,931,303 A | 6/1990 | Holm et al. | 426/549 |
| 5,073,281 A | 12/1991 | Paules et al. | 252/62 |
| 5,102,677 A | 4/1992 | Van Den Berghe | 426/446 |
| 5,137,745 A | 8/1992 | Zukerman et al. | 426/618 |
| 5,356,642 A | 10/1994 | Patterson et al. | 426/93 |
| 5,376,395 A | 12/1994 | Pels | 426/440 |
| 5,481,962 A | 1/1996 | Tedesco | 99/323.4 |
| 5,554,405 A * | 9/1996 | Fazzolare | 426/560 |
| 5,562,021 A | 10/1996 | Slanik | 99/349 |
| 5,614,239 A | 3/1997 | Tedesco | 426/445 |
| 5,755,152 A | 5/1998 | Menzin | 99/353 |
| 5,846,584 A | 12/1998 | Capodieci | 426/238 |
| 5,871,793 A | 2/1999 | Capodieci | 426/238 |
| 6,022,137 A | 2/2000 | White et al. | 366/295 |
| 6,068,868 A | 5/2000 | Capodieci | 426/238 |
| 6,083,552 A | 7/2000 | Kershman et al. | 426/559 |
| 6,143,336 A | 11/2000 | Capodieci | 426/238 |
| 6,171,631 B1 | 1/2001 | Willoughby et al. | 426/559 |
| 6,248,379 B1 | 6/2001 | Capodieci et al. | 426/93 |

OTHER PUBLICATIONS

Luh, Bor S., et al., *Parboiled Rice, Rice: Production and Utilization*, pp. 501–542.

Luh, Bor S., et al., *Quick Cooking Rice, Rice: Production and Utilization*, pp. 566–589.

Luh, Bor S., et al., *Breakfast Rice Cereals and Baby Foods, Rice: Production and Utilization*, pp. 622–649.

Putting of Rice Cakes as Influenced by Tempering and Heating Conditions, Hsieh et al.

Curriculum Vitae of Willy Depauw.

Declaration of Willy Depauw dated Jun. 6, 2002.

Declaration of Rene van den Berghe dated Oct. 1, 2001.

Three (3) sheets of photocopies of product manufactured by Hunt–Wesson, Inc., of Fullerton, CA, and called "Orville Redenbacher's 100% Popcorn Mini Cakes—Caramel flavor."

* cited by examiner

METHOD FOR MAKING A PUFFED FOOD STARCH PRODUCT

TECHNICAL FIELD

This invention relates generally to improved puffed food starch products made from cereal grains or other food starches, forming such products into various shapes, and the methods for their manufacture. More particularly, the present invention relates to puffed-rice snacks with improved crispiness, and appealing visual and physical texture, and processes of preparing such snacks.

BACKGROUND OF THE INVENTION

Snacks have long been a household staple around the world and range from treats to dietary supplements. However, not too long ago a nutrition trend found chocolates, candies, ice cream, and other naturally and artificially sweetened confections, as well as potato chips, pretzels, corn chips, and the like, being replaced by more healthy products. The terms "low fat," "no-fat," and "light" have become the watch words of the health conscious in the '90s. The trend has seen the popularity of puffed snacks, sometimes referred to as popped grain snacks and especially those made of corn and rice, steadily climb.

Very successful products have been made in the form of cakes generally made of puffed corn or rice. While these products had a heretofore acceptable amount of crispiness, they suffered from an unpleasant texture, usually nearest the core of the cake, resulting in the product sticking in teeth. The products are hockey puck-shaped (uniform in all three dimensions) and lack the appealing visual texture of conventional snack foods. The size of these snack cakes is also relatively large in size (approximately a three to four-inch disk-shaped cake). This size, as a single portion, can lead to a substantial amount of waste for some consumers, especially children. To address the problem of waste, a "mini-cake," or smaller versions of the original cake (about a one to two-inch disk-shaped cake or cracker) was introduced. The problems of texture and appearance, however, remained.

Examples of methods for making conventional grain cake products are disclosed in the described methods of U.S. Pat. No. 4,888,180 to Wu. These cake-forming devices are most frequently used with rice as the cereal grain since rice is capable of relatively easy expansion into a self-supporting cake. Statistics show that the availability and versatility of rice have not only made it an industry favorite, but a consumer favorite as well. The annual world rice harvest in the early 1990s exceeded 510 million metric tons, an increase of about 30 percent over the average during the period from 1979 to 1981. Rice grains are extensively used as human food, constituting the principal food of almost one-half the human race. The leading rice producers are China, with 36 percent of world output in the early 1990s, and India, with 22 percent. In the United States, production averaged close to 7 million metric tons, with Arkansas, California, Louisiana, and Texas being the leading rice-producing states.

Rice puffing and, in general, cereal puffing (or cereal popping) methods are well established in the prior art. Generally, methods known in the art rely primarily on a moisture content in the grains for puffing. The moisture content can be varied by many processes, such as, drying, cooking, parboiling, and tempering. Examples of attempted improvements in processing methods are described in U.S. Pat. Nos. 4,281,593 to Gevaert, 4,218,741 to Yoshikazu, and 4,667,588 to Hayashi.

There are two generally practiced methods for expanding or puffing grains: (1) heating the kernels of grain until they become extensible (i.e. until the starch becomes amorphous or flowable) at which point further heating permits evaporation of moisture (and out-gassing of some minor amounts of other gases entrained in the grain) which causes expansion (bubble formation) in the amorphous starch; (2) heating the grain kernels to a flowable state at atmospheric pressure, then suddenly reducing the pressure (partial vacuum) again permitting enhanced vaporization and out-gassing, and again causing expansion (bubble formation) in the amorphous starch; and (3) heating the grain kernels to a flowable state in a chamber where pressure is permitted (or caused) to build, then suddenly reducing the pressure to atmospheric permitting enhanced vaporization and out-gassing and again causing expansion (bubble formation) in the amorphous starch.

This latter method is most conventionally used to make rice cakes of both the larger and "mini" sizes. This latter method is carried out in what is commonly referred to as rice popping machines. These machines provide a chamber defined by heated chamber walls. Once the pre-puffed grain is placed in the chamber, it is closed to a pressure seal. The food starch is heated by contact with the chamber walls. The amount of food starch, i.e. the amount of grain kernels loaded into the chamber, relative to the volume of the chamber, and amount of expansion, cause the puffed product to generally conform in all three dimensions to the shape of the chamber.

One problem with conventional rice popping processes is that the filling of the entire volume of the popping chamber upon expansion may limit the bubble size formed, or full expansion of the bulk amount of the food starch, or both. This may account for a less than fully crisped product and a teeth-sticking texture of the resulting rice cake. It is certainly responsible for the hockey puck-shape of the product, which heretofore was thought to be desirable.

Another problem which exists in use of rice popping equipment is trying to balance providing sufficient time to present good conditions for full expansion of the food starch, while at the same time trying to minimize chamber residence time to achieve high production rates. To date, this balance has produced the conventional rice cakes discussed above.

It is well known that the degree and ease of puffing is affected by many factors such as: the type of grain, the type or preprocessing (e.g. milling), the condition of the grain (e.g. moisture content), and the type of starch contained in the grain. Another advancement in puffing food starch is to puff food starch which has been floured, and to extrude it into a discrete size and shape. Such extruded pieces are cooled and dried to a state of desired moisture content and hardness for acceptable handling and storage. To date, such puffing has been limited to oven puffing or deep frying. The resulting products, however, are relatively uniform throughout the snack piece, and provide a monolithic texture to the mouth when eating them. The same can be said for the products made from the more conventional process of extrusion puffing.

The inventor is unaware of a cake-type product ever being attempted using such pelletized stock. Further, it appears that prior to the present invention, it has never been contemplated to employ such a pelletized pre-product in a rice popping machine or related process.

In sum, despite the improvements being made in the field of making puffed snack cakes from food starches, in particular rice grain, insufficient attention has been given to improving the overall visual and physical texture (e.g. crispiness) and appearance of the product. The present invention addresses these issues as well as solving the problems discussed above and providing other advantages which will become apparent to those skilled in the art upon reading the accompanying specification and claims.

SUMMARY OF THE INVENTION

The present invention provides puffed food starch snacks having an improved crispy texture and a more aesthetic appearance and methods for preparing them.

In general terms, the products are snack chips, cakes, crackers or the like, made from food starch. Preferably, the starch material is provided primarily in the form of individual kernels or pellets of a cereal grain, such as rice, corn, wheat, rye, oats, millet, sorghum, barley, buckwheat, or mixtures thereof. Quantities of other food starches may also be employed as a co-mixed constituent, or as the primary source of bulk starch material, for example, potato starch. A quantity of the food starch is puffed (expanded) in a manner which forms a snack product of considerable crispiness, lightness, and unique texture to both the mouth and eye.

According to one aspect of the invention, a puffed snack product comprises a puffed starch body having a generally regular perimetrical shape, and opposed upper and lower surfaces. At least one of the upper and lower surfaces has a substantially wavy contour such that it appears as though individual kernels of grain are joined to one another. It is preferred that the substantially wavy surface of the starch body comprises hills and valleys, noted by the rise and fall of the surface along a parallel plane.

In a preferred embodiment, the puffed snack product is comprised primarily of rice starch, but may further include puffed corn starch, puffed wheat starch, puffed potato starch, or the like.

In other presently preferred embodiments, the puffed snack product may be comprised primarily or predominantly of puffed corn starch, puffed wheat starch, or puffed potato starch, with combinations of other such grains possible. Presently, a preferred perimetrical shape of the food product is generally circular, hence a rounded cake in two dimensions. Alternatively, other embodiments may include a perimetrical shape which is generally triangular, square, rectangular, or any other such geometric or fanciful shape as may be thought at the time to have consumer appeal or processing, handling, or packaging advantages.

According to another aspect of the invention, the bulk cake product is comprised of an amount of food starch in the form of a plurality of individual whole kernels of grain, puffed together. At least a portion of these whole kernels may be rice kernels, wheat kernels, or both, and may additionally include corn grits.

According to another aspect of the invention, the cake or snack body is formed from a bulk amount of food starch comprised of a plurality of individual pellets (formed from starchy flour) all puffed together. Such pellets are preferably made from rice flour, wheat flour, corn flour, potato flour or the like, and may additionally include corn grits. A sufficient amount of pellets (and corn grits, if desired) capable of becoming amorphous in the puffing chamber should be provided, such that all of the pellets and grits touch at least one other pellet or grit after becoming amorphous.

According to another aspect of the invention, a puffing chamber is provided having inner surfaces and a chamber volume. A bulk amount of the food starch is placed into the puffing chamber. The bulk amount of food starch material is caused to volumetrically expand. The expanding food starch is constrained in its expansion in at least a first dimension, while permitting expansion of the bulk amount in at least a second dimension.

The step of constraining expansion may additionally include constraining expansion of the bulk amount in a third dimension. The constraining may achieve a defining of the general shape of the final product in the first dimension, or in both the first and third dimensions. The defined shape may be provided by, in one particular embodiment, constraining expansion with certain of the inner surfaces of the puffing chamber. Preferably, for the snack cake disclosed in the example below, the unconstrained second dimension is height.

Another method of the present invention includes predetermining the bulk amount of food starch material to be placed into the chamber. The predetermining should provide a sufficient amount of whole kernels (or corn grits, if desired) capable of becoming amorphous, such that all of the kernels or grits, touch at least one other kernel or grit after becoming amorphous.

Where pellets are used, the method may further include forming the pellets generally to the size of a whole kernel of grain selected from the group of grains including rice, wheat, barley, oats, rye, and corn.

Another aspect of the invention provides for puffing a food starch capable of becoming amorphous into a food starch product, wherein the food starch is first floured, then pre-gelatinized in an extruder under a pressure and temperature. The food starch is then extruded and cut into pellets. The pelletized food starch is placed into a puffing chamber where increasing the pressure and the temperature in the chamber causes the pelletized food starch to become amorphous. By quickly reducing the pressure in the chamber, the amorphous starch pellets expand.

The pellets are believed to provide superior puffing (at least relative to a given time and temperature cycle in mass production) to whole kernels. While presently unproven, the advantages are believed to be that: (1) the pellets are pre-gelatinized and may allow more of the heat energy (in the given cycle time or amount of thermal energy) to contribute to water vaporization and bubble formation (as opposed to providing energy to accomplish a greater crystalline phase change) than in a grain kernel; (2) the pelletized rice has been pre-floured, hence the mechanical and physical boundaries of the cellular structure have already been broken down leading to a more uniform expansion with less (heat) energy required to break down the cellular structure; and (3) the uniform pellet structure has a more uniform distribution of both starch and moisture for improved crisp puffing.

According to another aspect of the invention, the extruded food starch pellets may be cooled under sufficiently controlled (slowly) parameters to reduce stress in the pellet (i.e. an annealing of the pellets). This should reduce the energy required for possible annealing in the popping chamber. Also, the slow drying should enhance endurance of further handling without fracturing. The extruded pellets should be provided with sufficient drying to enhance shelf life and to prevent pellets from sticking together in storage.

It is also possible that, once gelatinized, the pellets are cooled in such a way as to reduce recrystallization of the starch. This may also assist in puffing in that for a fixed amount of energy input, energy is not wasted unduly on annealing in the puffing chamber. However, such a cooling may be at odds with the slow cooling for stress reduction. While one type of cooling may be used as a trade off for the other, stress reduction presently looks to be the preferred goal.

DETAILED DESCRIPTION OF THE PREFERRED EMBODIMENT

While the invention is susceptible of embodiment in many different forms, this disclosure will describe in detail preferred embodiments of the invention with the understanding that the present disclosure is to be considered as an exemplification of the principles of the invention and is not intended to limit the broad aspect of the invention to the embodiments illustrated.

Product

The puffed or popped food starch products of the present invention provide a number of advantages over prior puffed food starch cake or cracker products. It is believed that the products are lighter, crispier, and have a more appealing visual texture as well as texture to the mouth when consumed. In some cases products made in accordance with the invention are believed to have a more natural unprocessed appearance, as illustrated in FIGS. 8–17.

However, the wavy, natural appearance provides functional advantages over the prior art as well. The undulating surface allows snack dips to be more easily scooped, much like a potato chip or corn chip, than hockey puck-shaped cakes. Additionally, the present product may be sprinkled with flavoring during manufacturing, including such savory flavors as barbeque, sour cream, cheese, garlic and onion, and most any other popular snack flavor. The highly textured surface provides longer retention of granular or crystalline flavor coatings. Additionally, because the top and bottom surface areas of each chip are larger than a standard flat surface of prior art cakes, a greater amount of flavoring may be applied. More flavoring may improve the overall flavor of a product that has enjoyed past commercial success.

Products according to the invention may be in the form of a snack chip, cake, or cracker. They can be made from individual kernels according to certain aspects of the invention and from individual pellets of extruded food starch material according to other aspects of the invention. Disclosed herein are cakes made from a cereal grain, such as rice, corn, wheat, rye, oats, millet, sorghum, barley, buckwheat, or mixtures thereof. A quantity of the grain is puffed (expanded) in a manner which forms a snack product of considerable lightness and crispiness over previous puffed-grain snacks.

The puffing phenomenon results from the sudden expansion of water vapor (steam) from moisture held within the starch material of the granule (and some out-gassing). The particle is fixed in its expanded state by the dehydration resulting from the rapid diffusion of water vapor out of it. The moisture level is considered an important factor in puffing grain. Before puffing, the grain or pellet preferably should be maintained at no less than 3% moisture in order to achieve the desired extent of puffing and crispiness of the final product. The preferred embodiment has a moisture content while falls within the range of from about 8% to about 18% (by weight) moisture, with about 8% to about 13% (by weight) being more preferred, and about 10% to about 12% being the most preferred moisture content. Moisture contents outside of the 8–18% range may cause a decreased puffing on the one hand, and collapse of an already puffed product on the other hand.

Figure 15:
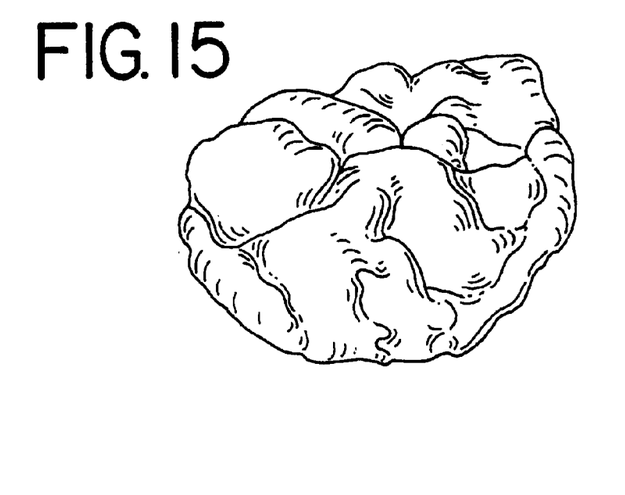
FIG. 15 is a perspective view of another puffed food starch product made in accordance with one embodiment of the present invention.
Figure 16:
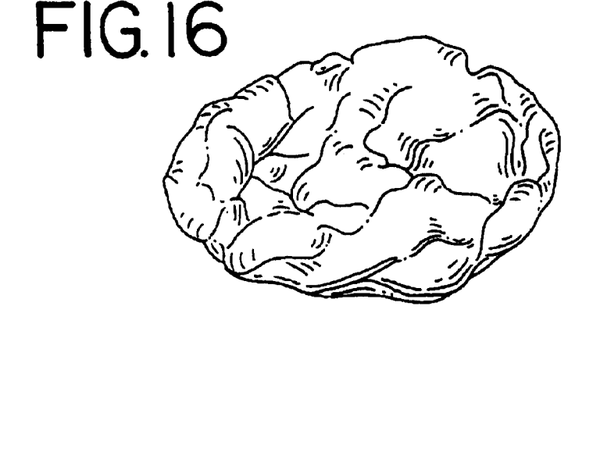
FIG. 16 is a perspective view of another puffed food starch product made in accordance with one embodiment of the present invention.
Figure 17:
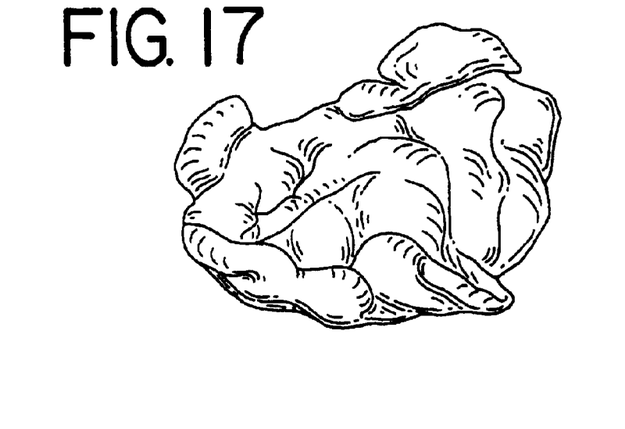
FIG. 17 is a perspective view of another puffed food starch product made in accordance with one embodiment of the present invention.

Rice grain is preferred for many reasons, including its capability to expand with relative ease into a self-supporting cake product. FIGS. 8–14 show various views of one embodiment of a snack cake according to the present invention. The puffed snack product of the present invention comprises a puffed starch body 10 having a generally regular perimetrical shape, and opposed upper and lower surfaces 12, 14. The perimetrical shape of body 10 is circular. Other shapes are contemplated, for example, other geometric shapes: triangular, square, rectangular, etc., and fanciful shapes may provide particular advantages in some instances. FIGS. 15–17 show food starch products with surface variations.

Referring to FIGS 8–14, the upper surface 12 and the lower surface 14 have a substantially wavy contour, and each surface 12, 14 has a general appearance which permits visual discrimination between individual kernels of grain 16 as they are joined to one another. It is preferred that the substantially wavy surface of the starch body 10 comprises hills 17 and valleys 18, noted by the non-uniform rise and fall of the surfaces 12, 14.

While the preferred starch body 10 is comprised primarily of rice, it may further include corn, wheat, potato, oats, rye, barley, buckwheat, or any combination of these or other suitable sources of puffable food starch. Hereafter, the terms "good" or "goods" are intended to describe starch-bearing materials, including cereal grains, seeds, tubers, and the like, which are used in the present process to make up the food starch of the starch bodies such as body 10 or in making up the bulk amount of food starch placed in the puffing chamber. Where applicable, these goods may be supplied in the form of ground flour, whole kernels, or in a pelletized form. Mixtures of goods in the form of flour, or mixed whole kernels or mixed pellets may also be used in accordance with the present invention, with varying results.

With respect to flour and whole kernels, single goods or mixtures of goods may be used to create a suitable puffable food starch composition. As rice is the preferred food starch in the disclosed embodiment of body 10, it should be understood it will be the preferred predominant good used in mixtures for many of the disclosed methods. A predominantly rice flour mixture may contain rice flour within the range of about 51% to 100% by weight. Similarly, predominantly corn flour mixture would be predominantly corn flour (i.e., at least 51% by weight). The remaining percentage, up to 49% by weight, may be made up of any one or more of other floured goods. This is equally true for a mixture of predominantly rice grain, or predominantly corn grit (i.e., cracked corn). It should be noted that moisture content of the respective starch constituents is counted in its weight percentage.

Pellets are more variable than either flour or whole kernels. The pellets themselves may be made from a mixture of goods from a flour form, and the entire composition may be comprised of several different kinds of pellets. For instance, "A" pellets may be formed from a mixture of 75% by weight rice flour and 25% by weight corn flour, while "B" pellets may be formed from 60% by weight rice flour and 40% by weight potato flour. A first recipe may call for 50% by weight of "A" pellets and 50% by weight of "B" pellets, while a second recipe may require 90% by weight "A" pellets and only 10% by weight of "B" pellets. The various combinations are nearly infinite.

Of the three forms of goods disclosed, pellets are a preferred form, according to a separate aspect of the invention. Pellets provide excellent textural features (e.g., crispiness, contour, etc.), produce a high-quality puffed product, and allow more precise control of moisture content. While rice is the preferred good for the pelletized form in the present invention, other embodiments of the puffed snack product may be comprised primarily of corn, wheat, or a puffed potato starch, with combinations and other such grains (or starches from sources other than grains) also possible.

Part of what gives the present invention its unique surface contour is the composition of the bulk food starch. The various goods will all have different expandability, partly dependent upon moisture content and partially due to the differing starch characteristics, compositions, or pre-processing (such as pre-gelatinization). By assembling a bulk food starch of predominantly rice (either flour, whole kernels, or pellets) interspersed with, for instance, the preferred corn grits, the puffed product will have natural surface and texture variations due to varied expansion. Therefore, to facilitate this effect in the present invention, at least a portion of the bulk food starch in certain embodiments will be enhanced by the inclusion of corn grits which do not expand as much as rice pellets or kernels.

Referring again to FIGS. 8–14, regardless of the good)(s) or form used, according to one aspect of the invention, the product has a generally predefined perimetrical shape. Preferably, the perimetrical shape of the food product is one that is appealing to consumers and is suitable for use in a chamber-type popping machine. Applicant has found a circular shape to meet both of these requirements. It is also believed that there may be textural advantages of the circular shape.

In order to form the preferred product, which is more easily understood with reference to the described methods, a sufficient amount of whole kernels or pellets (and corn grits) capable of becoming amorphous, should be provided such that all of the whole kernels or pellets (and grits) touch or contact at least one other whole kernel or pellet (or grit) after becoming amorphous. In other words, the bulk food starch is capable of melting into a single flowable mass. This means that the amount of bulk food starch used for making the present inventive product is an important feature, as discussed below.

The area of contact between two or more of the kernels or pellets form a connective boundary after they become flowable. This boundary defines the area of connection between kernels or pellets. The preferred puffed product is most readily broken apart at these boundaries, as opposed to breaking within the body of the puffed kernel or pellet. This adds to the aesthetic appearance of the product according to the present invention. Prior art grain cakes are typically comprised of indistinct or less distinguishable boundaries between puffed kernels, breaking along less visually determinable lines.

Another textural distinguishing aspect of the present invention over the prior art relates to the product thickness. The preferred product is typically a single layer, approximately one grain thick. This helps insure contact between individual kernels, pellets, and grits occurs on no more than two dimensions (i.e., primarily side-to-side connection). This, in turn, insures the added eating textural appeal of individual kernels or pellets in each puffed product. Conversely, the prior art cakes are several grains thick, causing three dimensional contact (i.e., side-to-side and top-to-bottom connections). Such three-dimensional contact removes the added aesthetic and textural crispiness and appeal of the individual kernels or pellets within the cake. This again relates to the amount of bulk food starch relative to the puffing chamber volume and resting area.

Processes

In many prior art processes, an amount of food starch (in whole kernel form only) is added to a puffing chamber so that upon expansion the food starch fills the entire chamber. The result is a puffed product conformed exactly to the size and shape of the chamber, in substantially the form of a disk. This is very different than the present invention.

Figure 18:
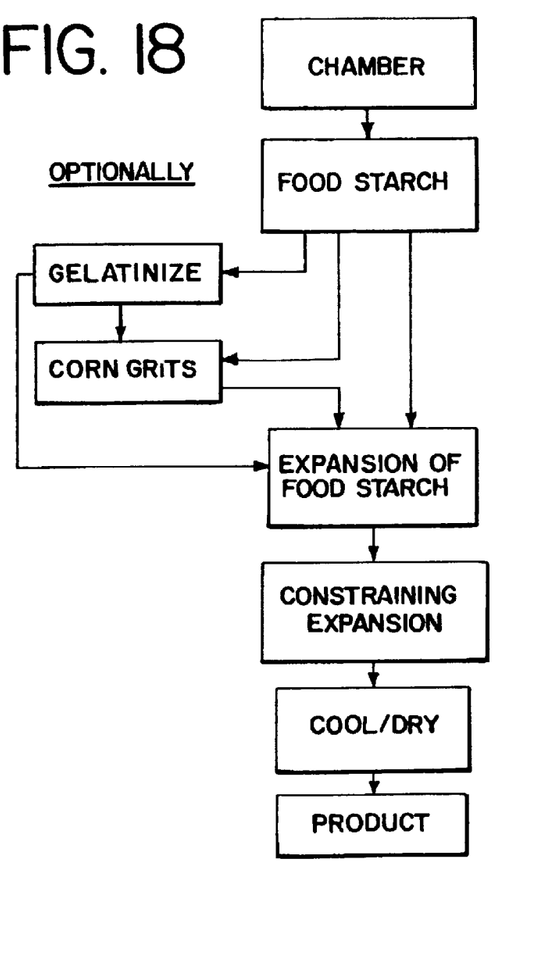
FIG. 18 is a flow chart illustrating an embodiment of the present method for producing a puffed food starch product.

A preferred method of making the puffed food starch product of the present invention, illustrated in FIG. 18, utilizes a bulk amount of a previously described food starch. The disclosed method begins by providing a puffing chamber having inner surfaces and a chamber volume, and then placing a bulk amount of the food starch material into the puffing chamber. Generally speaking, the bulk amount of food starch is caused to volumetrically expand. In other words, the bulk food starch is puffed to several times its original size.

Figure 1:
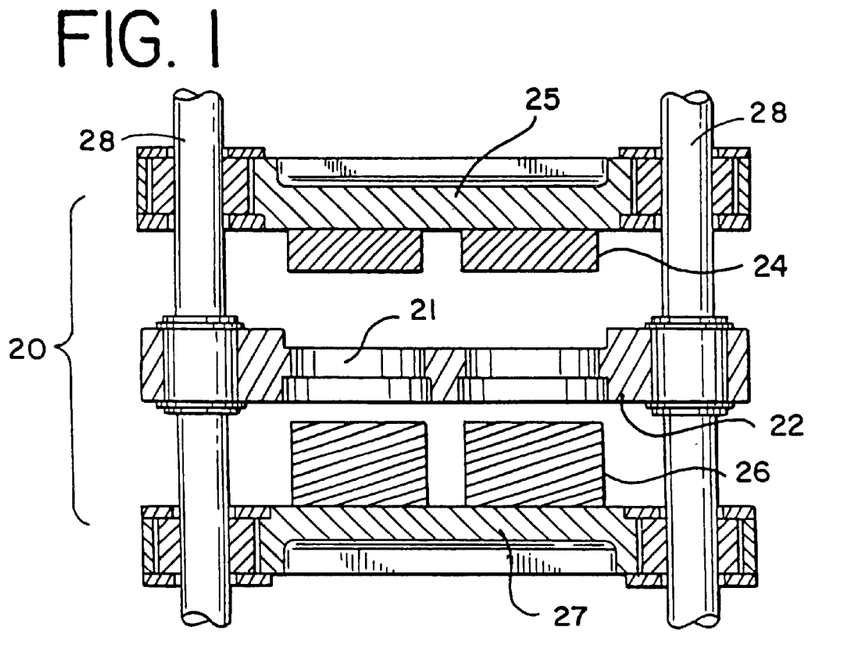
FIG. 1 is a cut-away side view depicting a puffing machine used in the present invention in a completely open position.
Figure 2:
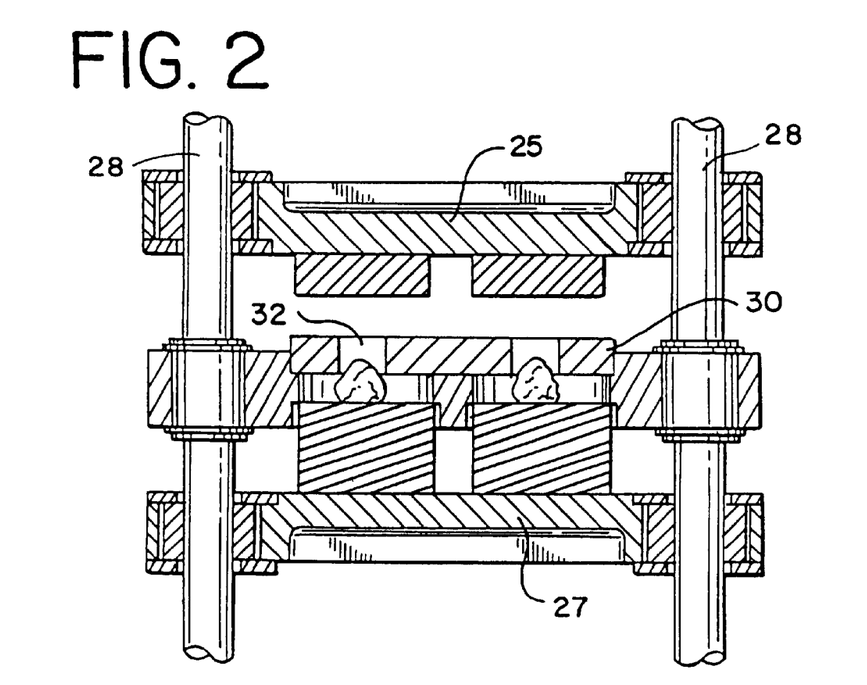
FIG. 2 is a similar view of the puffing machine of FIG. 1 showing the placement of food starch within a couple of chambers.
Figure 3:
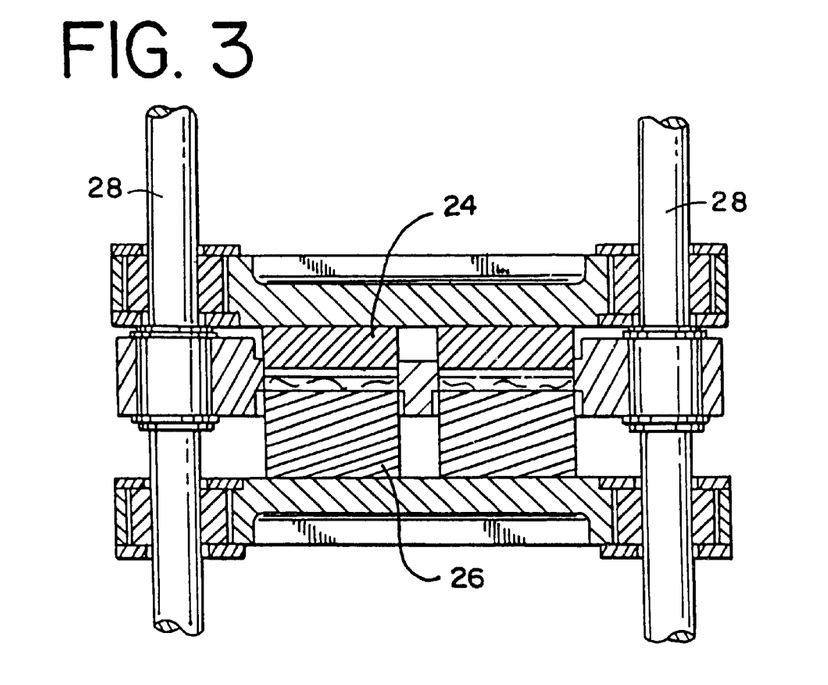
FIG. 3 is a similar view of the puffing machine of FIG. 1 showing the sealed chambers.

Puffing machines (usually having a plurality of chambers each) are widely known and understood by those skilled in the art. A suitable puffing machine is manufacture by REAL FOODS PTY., LTD. of St. Peters NSW, Australia. Referring to FIGS. 1–6, puffing chamber 20 is shown, generally, having an opening 21 on ring mold 22, upper mold insert 24 (attached to an upper base 25), and lower mold insert 26 (attached to a lower base 27). Each of these components may be slidably movable on guide pins 28, though ring mold 22 is typically fixed. The mold inserts 24, 26 (via bases 25, 27) may be actuated hydraulically, pneumatically, or in any other suitable manner. As shown in FIGS. 2 and 3, mold inserts 24, 26 enter opening 21 to form the inner surfaces of the puffing chamber.

The present preferred method requires constraining the expansion of the bulk amount of food starch in at least a first dimension, while permitting expansion of the bulk amount in at least a second dimension. In other words, the food starch is capable of expanding to its full volumetric potential (taking into account moisture content of the food starch, temperature of the chamber, and the forces of gravity), while being prevented from expanding in one of either height, width, or depth. For example, if the height of the puffed product is constrained, then the width and depth of the puffed product proportionately increase. Where two dimensions are constrained, the third will compensate to achieve total volume expansion. At no time is the total volumetric expansion of the puffed product constrained by the inner surfaces of the puffing chamber, while dimensional expansion is constrained. Preferably, this may be achieved by predetermining the proper amount of the bulk amount of food starch placed into the puffing chamber relative to the total volume of the chamber in an unsealed (puffing) condition. Prior art processes attempt to completely fill the chamber (at least upon puffing).

Using the puffing chamber for dimensional constraining may be achieved by defining a general shape of the product (as discussed previously) in the first dimension, or in both the first and third dimensions. The constrained shape may be provided by, in one particular embodiment, constraining expansion with the inner surfaces of the puffing chamber.

Balanced against the unconstrained volumetric expansion aspects of the present invention (i.e., properly sizing the bulk amount of food starch placed into the puffing chamber) is the necessity to produce a single, unitary product from the puffing chamber. With these competing interests in mind, the present method may further include predetermining the bulk amount of food starch to be placed into the chamber, such that there is a sufficient amount of whole kernels or pellets (or corn grits) that all of the kernels or pellets (and grits) touch at least one other kernel or pellet (or grit) after becoming amorphous.

Figure 20:
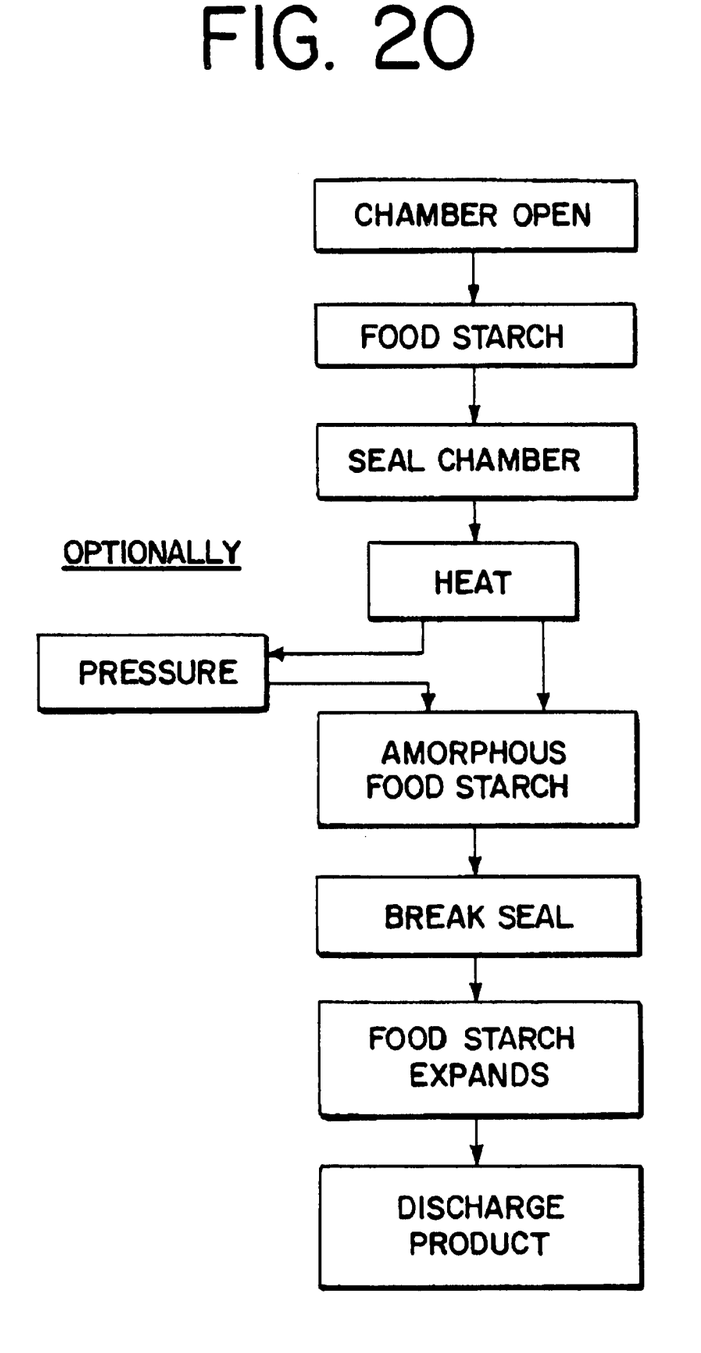
FIG. 20 is a flow chart generally illustrating the operation of the puffing machine.

While the exact mechanism of how the food starch bonds together in the puffing chamber is not fully understood, referring to FIG. 20, it is believed that a melt occurs, or at least a softening or gelatinization of the food starch. In a preferred embodiment of the invention, the puffing chamber 20 is heated to a temperature of about 475° F. (about 246° C.). Puffing machines, as well as individual puffing chambers, however, can vary greatly from one to another. Due to such differences, and any other prevailing conditions which may exist (e.g., the amount and type of food starch and its preprocessing history), the chamber temperature may range from about 350° F. (about 177° C.) to about 550° F. (about 288° C.), including any combination or subcombination of ranges within this range. As the chamber is sealed and the food starch is heated, the internal pressure of the chamber increases, though a final pressure has not been measured. No additional pressure is added to the chamber in the preferred embodiment, but may be implemented for alternative embodiments.

Figure 7:
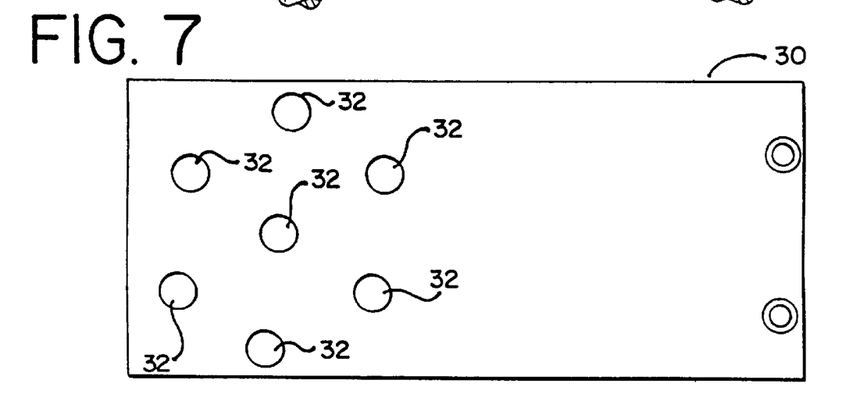
FIG. 7 is a top view of a supply plate for the present invention.
Figure 8:
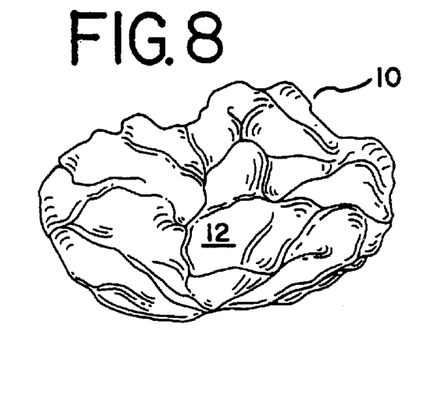
FIG. 8 is a perspective view of a puffed food starch product made in accordance with one embodiment of the present invention.
Figure 9:
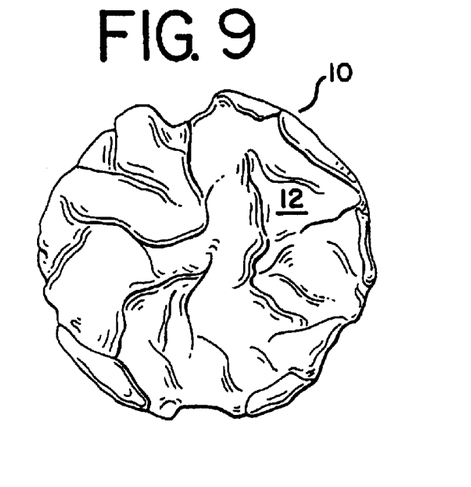
FIG. 9 is a top view of a puffed food starch product as shown in FIG. 8.
Figure 10:
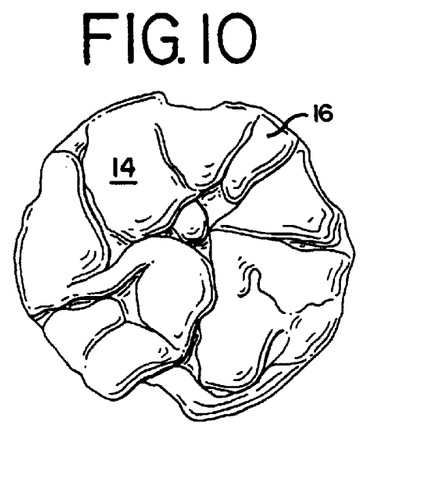
FIG. 10 is a bottom view of a puffed food starch product as shown in FIG. 8.
Figure 11:
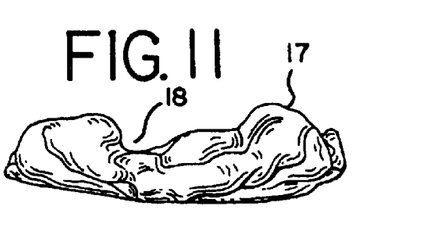
FIG. 11 is a first side view of a puffed food starch product as shown in FIG. 8.
Figure 12:
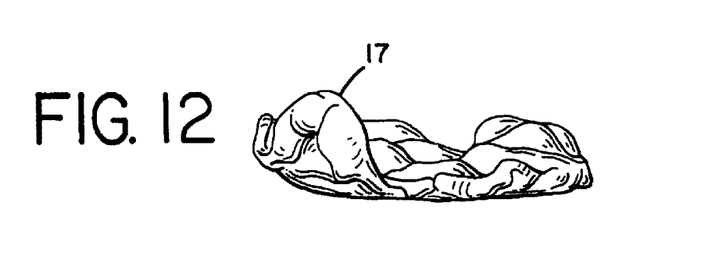
FIG. 12 is a second side view of a puffed food starch product as shown in FIG. 8.
Figure 13:
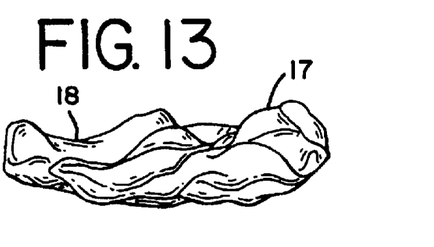
FIG. 13 is a third side view of a puffed food starch product as shown in FIG. 8.
Figure 14:
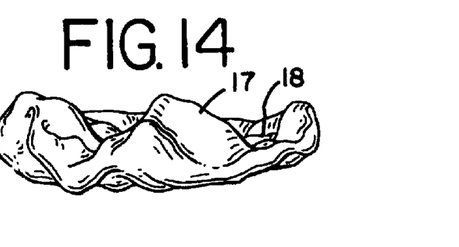
FIG. 14 is a fourth side view of a puffed food starch product as shown in FIG. 8.

Referring to FIG. 7, a supply plate 30 is shown. Supply plate 30 is shown having seven (7) openings 32, but may contain more or less to suit particular manufacturing needs. Openings are preferably about 0.563 inches diameter by about 0.591 inches deep (about 0.147 cubic inches) to allow a sufficient amount of bulk food starch to pass through for puffing an approximately two inch (2") product, but these dimensions may vary for larger or smaller products. The volume of opening 32 determines the amount of food starch to be added to each chamber. Each opening 32 corresponds to a chamber 20 of the puffing machine. As supply plate 30 moves across the open ring mold 22, it deposits the predetermined amount of bulk material filling each opening volume into the chamber 20, to rest on lower mold insert 26. Supply plate 30 is then retracted.

Figure 4:
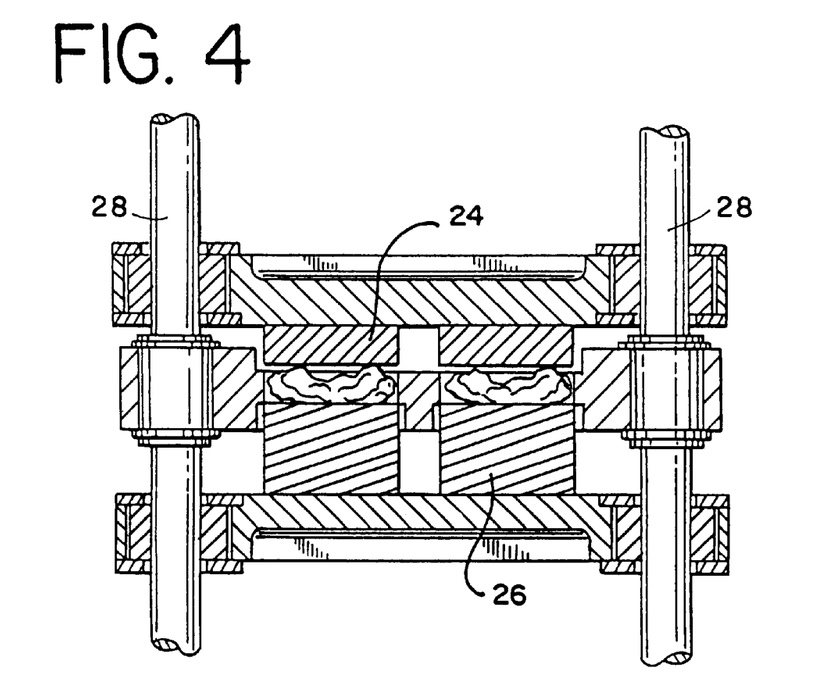
FIG. 4 is a similar view of the puffing machine of FIG. 1 just subsequent to breaking the seal on the chambers.
Figure 5:
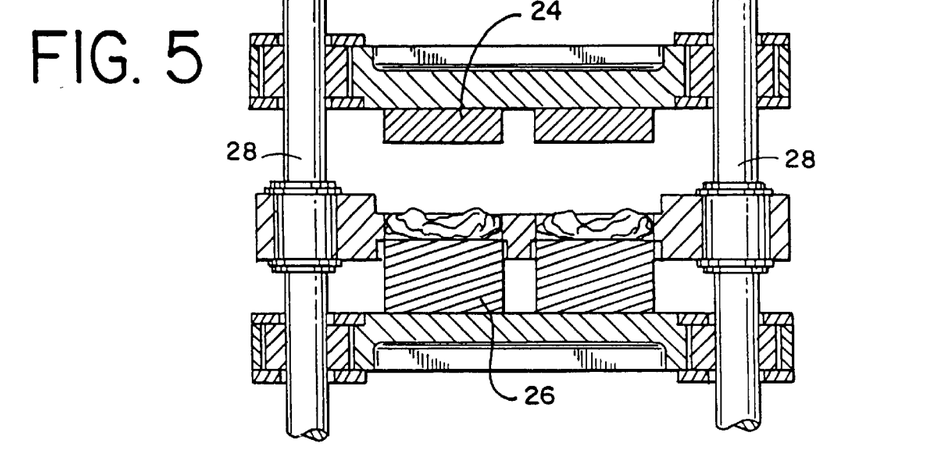
FIG. 5 is a similar view of the puffing machine of FIG. 1 showing the upper mold fully retracted.
Figure 6:
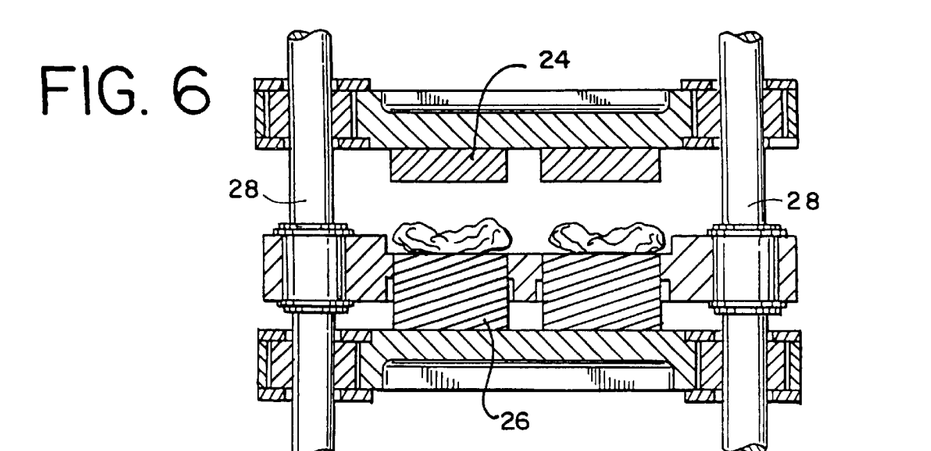
FIG. 6 is a similar view of the puffing machine of FIG. 1 showing the final product being ejected from the mold.

The chamber is closed as shown in the sequence of FIGS. 2–5, and the bulk food starch is heated to an amorphous or extensible state. After an approximate 5.25 to 6.75 second heating cycle time, upper mold insert 24 raises to release pressure in chamber 20, as shown in FIG. 4. Then upper mold insert 24 completely raises and lower mold insert 26 raises to become flush with the upper surface of ring mold 22, as shown in FIG. 6. Finally, supply plate 30 returns to make a subsequent deposit, pushing the puffed food starch products to a discharge chute (not shown) in the process.

Figure 19:
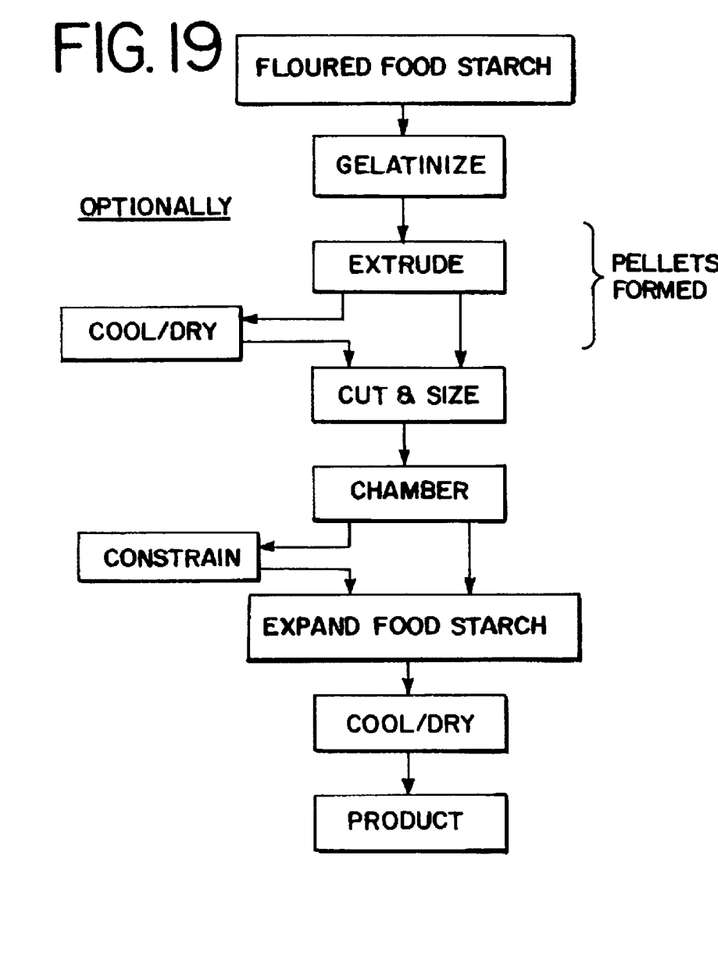
FIG. 19 is a flow chart illustrating another embodiment of the present method for producing a puffed starch product using pelletized food starch.

The amount of food starch used in the present invention is less than that used in prior art processes. A relationship exists between the mass of food starch used and the expansion of the final product, also taking into consideration the chamber volume (about 0.79 cubic inches in the present invention), cycle time, and chamber temperature. Basically, the expanded food starch should not be constrained by the chamber volume, as discussed above. Another consideration, however, is the placement of the food starch within the chamber. If the food starch is thick or mounded on top of itself, then expansion of the food starch as a whole will be diminished. Thinly spread food starch will tend to puff more completely.

Where pellets are used in the present invention, it is considered to be within the knowledge of those skilled in the art to prepare suitable pellets. The J.R.SHORT COMPANY, Chicago, Ill., manufactures such a rice pellet. Basically, referring to FIG. 19, beginning with a floured food starch, the starch is gelatinized in an extruder under a pressure and temperature. The food starch is then extruded and cut, forming individual pellets. The pellets, in the preferred embodiment, are formed generally to the size of a whole kernel of grain. The grain size can be selected from the group of grains including rice, wheat, barley, oats, rye, corn, etc. The extruded food starch pellets may be cooled sufficiently (i.e., slowly) to substantially reduce any stress in the pellet, and to provide sufficient drying to provide good shelf life and prevent extruded food starch pellets from sticking together in storage.

In another preferred embodiment of the present method, Applicant found advantages in pelletizing the food starch material, and then placing an amount of the pelletized food starch into the puffing chamber. The amount may be as little as a single pellet, or as many as suitable for the chamber size. The pellets within the chamber are then caused to volumetrically expand and form a suitable cake or chip.

Another major advantage of the use of pellets over whole kernels is that the pellets need not be tempered prior to puffing. Tempering is a process whereby the whole kernels are tumbled in a high moisture atmosphere (frequently steam is used). This is not necessary for pellets. The moisture content of the pellets is controlled at manufacture, most preferably within the range of about 10% to about 12% (by weight). Additionally, the tempering process is used to increase the puffability of the kernels, as described above. Pelletization appears to provide sufficient enhancements to puffability to negate the need for tempering.

While specific embodiments have been illustrated and described, numerous modifications are possible without departing from the spirit of the invention, and the scope of protection is only limited by the scope of the accompanying claims.

We claim:

1. A method for making a puffed food starch material product from a bulk amount of food starch material, which food starch material is capable of volumetric expansion in three dimensions, namely width, depth and height, during puffing thereof, the method comprising:
   providing a puffing chamber having inner surfaces and a chamber volume;
   placing a bulk amount of food starch material into the puffing chamber in a quantity that, upon puffing in the chamber, will form a single, unitary puffed food starch material product; and
   causing a volumetric expansion of the bulk amount of food starch material placed in the chamber to form a single, unitary puffed food starch material product by constraining expansion of the bulk amount of food starch material in the chamber in at least a first dimension, while permitting unconstrained expansion of the bulk amount of food starch material in at least a second dimension.

2. The method of claim 1 wherein constraining expansion includes constraining expansion of the bulk amount of food starch in a third dimension.

3. The method of claim 2 wherein the constraining includes defining a general shape of the product in both the first and third dimensions.

4. The method of claim 2 further including:
   predetermining the bulk amount of food starch material to be placed into the chamber; and
   wherein the bulk amount is in a form sufficient to provide whole kernels in the puffing chamber, wherein the kernels become amorphous upon heating and each kernel touches at least one other kernel after becoming amorphous.

5. The method of claim 4 wherein the bulk amount of food starch material comprises a plurality of individual whole kernels of grain.

6. The method of claim 5 wherein the plurality of the individual whole kernels of grain comprises rice kernels.

7. The method of claim 6 wherein the plurality of the individual whole kernels of grain further comprises corn grits.

8. The method of claim 5 wherein the bulk amount of food starch material also includes corn grits.

9. The method of claim 5 comprising placing kernels in the puffing chamber in a single layer and thereafter expanding the pellets while in a single layer.

10. The method of claim 4 wherein the whole kernels of grain comprise wheat kernels.

11. The method of claim 10 wherein the whole kernels of grain comprise rice kernels.

12. The method of claim 11 wherein the bulk amount of food starch material also includes corn grits.

13. The method of claim 10 wherein the bulk amount of food starch material also includes corn grits which become amorphous upon heating.

14. The method of claim 13 further including providing sufficient kernels and corn grits in the puffing chamber such that all of the kernels and corn grits will touch at least one other kernel or grit after becoming amorphous.

15. The method of claim 1 wherein the constraining includes defining a general shape of the product in the first dimension.

16. The method of claim 1 wherein constraining expansion includes constraining expansion with inner surfaces of the puffing chamber.

17. The method of claim 1 wherein the unconstrained second dimension is height.

18. The method of claim 1 wherein placing a bulk amount of food starch material comprises placing a plurality of individual man-made pellets formed from starchy flour into the puffing chamber, the pellets made by gelatinizing starchy flour and forming the gelatinized starchy flour into pellets.

19. The method of claim 18 wherein each individual pellet of the plurality of individual pellets includes rice starch.

20. The method of claim 19 wherein each individual pellet of the plurality of individual pellets includes potato starch.

21. The method of claim 20 wherein the bulk amount of food starch material also includes corn grits.

22. The method of claim 20 further including forming the rice pellets generally to the size of a whole kernel of rice.

23. The method of claim 19 wherein the bulk amount of food starch material also includes corn grits.

24. The method of claim 23 further including providing sufficient pellets and corn grits in the puffing chamber such that, when the pellets and corn grits become amorphous upon heating, each pellet or grit touches at least one other pellet or grit.

25. The method of claim 19 further including forming the pellets generally to the size of a whole kernel of grain selected from the group consisting of rice, wheat, barley, oats, rye, corn, sorghum, millet, buckwheat, and seeds.

26. The method of claim 25 including providing sufficient pellets in the puffing chamber such that, when the pellets become amorphous upon heating, each pellet touches at least one other pellet.

27. The method of claim 25 further including gelatinizing the bulk amount of food starch material before placing it into the chamber.

28. The method of claim 18 wherein the bulk amount of food starch material also includes corn grits.

29. The method of claim 18 wherein each individual pellet of the plurality of individual pellets includes wheat starch.

30. The method of claim 29 wherein each individual pellet of the plurality of individual pellets includes rice starch.

31. The method of claim 30 wherein each individual pellet of the plurality of individual pellets includes potato starch.

32. The method of claim 31 wherein the bulk amount of food starch material also includes corn grits.

33. The method of claim 31 further including forming the rice pellets generally to the size of a whole kernel of rice.

34. The method of claim 30 wherein the bulk amount of food starch material also includes corn grits.

35. The method of claim 29 wherein each individual pellet of the plurality of individual pellets includes potato starch.

36. The method of claim 29 wherein the bulk amount of food starch material also includes corn grits.

37. The method of claim 29 further including forming the pellets generally to the size of a whole kernel of rice.

38. The method of claim 18 further including providing sufficient pellets in the puffing chamber such that, when the pellets become amorphous upon heating, each pellet touches at least one other pellet.

39. The method of claim 38 further including forming the pellets generally to the size of a whole kernel of rice.

40. The method of claim 18 further including gelatinizing the bulk amount of food starch material before placing it into the chamber.

41. The method of claim 18 comprising placing the pellets in the puffing chamber in a single layer and thereafter expanding the pellets while in a single layer.

42. The method of claim 41 comprising placing kernels in the puffing chamber in a single layer and thereafter expanding the pellets and kernels in a single layer.

43. The method of claim 1 further including gelatinizing the bulk amount of food starch material before placing it into the chamber.

44. The method of claim 1 wherein the volumetric expansion of the food starch material in the second dimension is unconstrained by the chamber volume.

45. The method of claim 1 wherein placing a bulk amount of food starch material comprises placing a plurality of individual pellets formed from starch material and flour into the puffing chamber, the pellets made by gelatinizing the starch material and flour and forming the gelatinized starch and flour into pellets.

46. The method of claim 1 wherein the unitary product produced by the volumetric expansion has two sides and comprises a wavy contour on at least one of said sides.

47. The method of claim 1 wherein the unitary product produced by the volumetric expansion has two sides and comprises a wavy contour on both of said sides.

48. A method of making a puffed food starch material product in a puffing chamber comprising:
placing in the puffing chamber a predetermined amount of a food starch material that is capable of volumetric expansion in three dimensions, namely width, depth and height, the predetermined amount being a sufficient quantity so that, when expanded in the puffing chamber, a single, unitary, puffed food product is formed; and
causing volumetric expansion of the food starch material in the puffing chamber to form a single, unitary puffed food starch material product and, during the volumetric expansion in the chamber constraining expansion of the predetermined amount of food starch material in at least a first dimension and permitting unconstrained expansion of the food starch material in at least a second dimension in the puffing chamber.

49. The method of claim 48 further comprising, during the volumetric expansion, constraining expansion of the food starch material in at least a third dimension.

50. The method of claim 49 further comprising, during the volumetric expansion, constraining expansion of the food starch material in the first and third dimensions.

51. The method of claim 48 wherein the constraining expansion includes defining a general shape of the product in both the first and third dimensions.

52. The method of claim 48 wherein placing a predetermined amount of food starch material comprises placing a plurality of individual pellets formed from a partially gelatinized food starch material into the puffing chamber, the pellets made by partially gelatinizing food starch material and forming pellets from the partially gelatinized food starch material.

53. The method of claim 52 further including providing sufficient pellets and corn grits capable of becoming amorphous as a result of heating in the puffing chamber such that, when the pellets and corn grits become amorphous upon heating, each pellet or grit touches at least one other pellet or grit.

54. The method of claim 53 further including forming the pellets generally to the size of a whole kernel of rice.

55. The method of claim 53 further including forming the pellets generally to the size of a whole kernel of grain selected from the group consisting of rice, wheat, barley, oats, rye, corn, sorghum, millet, buckwheat, and seeds.

56. The method of claim 53 further comprising placing a plurality of corn grits with the pellets into the puffing chamber.

57. The method of claim 52 further including forming the pellets generally to the size of a whole kernel of rice.

58. The method of claim 52 comprising placing the pellets in the puffing chamber in a single layer and thereafter expanding the pellets while in a single layer.

59. The method of claim 48 wherein placing a predetermined amount of food starch material comprises placing a plurality of individual pellets formed from starch material and flour into the puffing chamber.

60. The method of claim 59 further comprising placing a plurality of corn grits with the pellets into the puffing chamber.

61. The method of claim 48 further including providing sufficient pellets, capable of becoming amorphous as a result of heating, in the puffing chamber such that when the pellets become amorphous upon heating, each pellet touches at least one other pellet.

62. The method of claim 48 wherein the unitary product produced by the volumetric expansion has two sides and comprises a wavy contour on at least one of said sides.

63. The method of claim 48 wherein the unitary product produced by the volumetric expansion has two sides and comprises a wavy contour on both of said sides.

* * * * *